US006795702B2

United States Patent
Sennett

(10) Patent No.: US 6,795,702 B2
(45) Date of Patent: *Sep. 21, 2004

(54) CUSTOMIZED ON-LINE USER GUIDE

(75) Inventor: DeWayne A. Sennett, Redmond, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 147 days.

This patent is subject to a terminal disclaimer.

(21) Appl. No.: 10/108,275

(22) Filed: Mar. 26, 2002

(65) Prior Publication Data
US 2002/0098833 A1 Jul. 25, 2002

Related U.S. Application Data

(63) Continuation of application No. 08/956,130, filed on Oct. 22, 1997, now Pat. No. 6,400,940.

(51) Int. Cl.[7] .................................................. H04Q 7/20
(52) U.S. Cl. ................................. 455/414.1; 455/412.1
(58) Field of Search ......................... 455/412.1, 412.2, 455/414.1, 414.3, 422.1, 556.1, 556.2, 557, 552.1, 553.1, 550.1, 561, 461, 433, 410, 411, 516, 558; 370/356; 380/28, 24, 23; 713/155, 183; 379/127, 93.25, 142, 207

(56) References Cited

U.S. PATENT DOCUMENTS

| 4,652,698 A | 3/1987 | Hale et al. |
| 4,680,786 A | 7/1987 | Baker et al. |
| 4,754,326 A | 6/1988 | Kram et al. |
| 4,965,821 A | 10/1990 | Bishop et al. |
| 5,090,050 A | 2/1992 | Heffernan |
| 5,297,183 A | 3/1994 | Bareis et al. |
| 5,299,260 A | 3/1994 | Shaio |
| 5,313,653 A | 5/1994 | Sasuta |
| 5,327,529 A | 7/1994 | Fults et al. |
| 5,345,501 A | 9/1994 | Shelton |
| 5,428,815 A | 6/1995 | Grube |
| 5,440,614 A | 8/1995 | Sonberg et al. |
| 5,471,645 A | 11/1995 | Felix |
| 5,535,323 A | 7/1996 | Miller et al. |
| 5,561,446 A | 10/1996 | Montlick |
| 5,577,103 A | 11/1996 | Foti |
| 5,603,084 A | 2/1997 | Henry, Jr. et al. |
| 5,610,973 A | 3/1997 | Comer |
| 5,625,669 A | 4/1997 | McGregor et al. |
| 5,630,159 A | 5/1997 | Zancho |
| 5,638,412 A | 6/1997 | Blakeney, II et al. |
| 5,655,215 A | 8/1997 | Diachina |
| 5,694,120 A | 12/1997 | Indekeu et al. |
| 5,754,955 A | 5/1998 | Ekbatani |

(List continued on next page.)

FOREIGN PATENT DOCUMENTS

| CA | 2149135 | 11/1993 |
| CA | 2228417 | 8/1995 |
| CA | 2189515 | 11/1996 |
| WO | 96 28945 A | 9/1996 |

Primary Examiner—Jean Gelin
(74) Attorney, Agent, or Firm—Klarquist Sparkman, LLP

(57) ABSTRACT

A method and a system for providing automated information to a subscriber of a mobile telecommunications system in which a request for information is received on a mobile telecommunications system from a mobile communications device, such as a cellular telephone or a personal communications device. A type of mobile communication device from which the request for information is received is determined by accessing a mobile communications device profile based on an ESN and an MIN associated with the mobile communications device. The requested information is then sent to the mobile communications device. The requested information is context specific to the type of mobile communications device from which the request for information is received.

24 Claims, 1 Drawing Sheet

U.S. PATENT DOCUMENTS

| | | |
|---|---|---|
| 5,835,860 A | 11/1998 | Diachina |
| 5,884,032 A | 3/1999 | Bateman et al. |
| 5,884,157 A | 3/1999 | Karmi |
| 5,887,249 A | 3/1999 | Schmid et al. |
| 5,933,778 A | 8/1999 | Buhrmann et al. |
| 5,978,450 A | 11/1999 | McAllister et al. |
| 5,987,331 A | 11/1999 | Grube et al. |
| 6,018,715 A | 1/2000 | Lynch et al. |
| 6,112,078 A * | 8/2000 | Sormunen et al. .......... 455/411 |
| 6,137,870 A | 10/2000 | Scherer |
| 6,157,829 A | 12/2000 | Grube et al. |
| 6,167,255 A | 12/2000 | Kennedy, Jr. et al. |
| 6,272,333 B1 | 8/2001 | Smith |
| 6,321,257 B1 * | 11/2001 | Kotola et al. ............... 709/219 |
| 6,400,940 B1 * | 6/2002 | Sennett .................... 455/414.1 |

* cited by examiner

CUSTOMIZED ON-LINE USER GUIDE

RELATED APPLICATIONS

This application is a continuation of application Ser. No. 08/956,130, filed Oct. 22, 1997, U.S. Pat. No. 6,400,940.

BACKGROUND OF THE INVENTION

1. Field of the Invention

The present invention relates to the field of telecommunications. More particularly, the present invention relates to a method and a system for providing automated information to users of a mobile communications system.

2. Description of the Related Art

Mobile, or wireless, telecommunications service providers offer a variety of services to subscribers, such as call forwarding and voice-mail messaging. As the number of services grow, it is increasingly difficult for subscribers to remember how to access all of the features of a particular service from a mobile telephone because feature codes are usually numeric values, such as *56 or *71, having no apparent association with a particular feature. Similarly, some features are infrequently accessed by a subscriber, such as changing call forwarding when going on vacation, and are not readily remembered.

One approach to overcome this problem that has been tried by some mobile telecommunications service providers is to distribute printed handbooks to subscribers. This approach has met with limited success because it is not realistic to expect subscribers to carry and refer to such a handbook.

Some mobile telecommunications service providers have tried to address the problem of providing help information by providing a "611" number that connects a subscriber to a customer service representative. Nevertheless, it is desirable to automate customer help service as much as possible so that subscribers are not required to wait for a customer service representative.

Providing automated help via telephone or other electronic communications system is well-known. In such a systems a user enters an information request using either DTMF tones or spoken words that are recognized using well-known speech recognition techniques. For example, U.S. Pat. No. 5,297,183 to Bareis et al. discloses a cellular telecommunications system that uses spoken commands for dialing telephone calls. The Bareis et al. system includes a speaker-dependent speech recognition system that performs customized functions based on the MIN of the subscriber. Pre-recorded instructional messages are generated by the system for instructing a subscriber on progress in using the system, such as prompts like "Ready for command", and "Phone number please". While the Bareis et al. system provides automated help for customizing dialing functions in response to spoken commands, the Bareis et al. system does not respond to a request for information about a specific service function or feature.

Further, help information is typically most needed when a subscriber is roaming into another market area that provides different features and feature codes than offered in the subscriber's home market. For example, in the situation when a subscriber roams into a market area that provides a Do Not Disturb (DND) service from a market area that does not provide such a service, dialing 611 may not provide the subscriber with the desired help information because a 611 call will be routed to a customer service facility for the visited market and may not provide the same interface capability as the customer service facility of the subscriber's home market.

Another related problem associated with providing automating help services for wireless subscribers is that each different wireless telephone type of model potentially accesses service features in a different way. Consequently, automation of help service functions becomes complicated because different subscribers need different help explanations based on their terminal equipment. Providing context sensitive help information in a computer system environment is well-known. For example, U.S. Pat. No. 5,535,323 to Miller et al. discloses a system for providing help to computer system users. According to Miller et al., context sensitive help is tailored to the needs of individual users. Nevertheless, Miller et al. does not disclose that help information can be provided based on the equipment used by the user requesting the help information. Further, Miller et al. is directed to a computer system environment, not a telecommunications system environment.

What is needed is a way to provide automated help information to subscribers of a mobile telecommunications system that is context sensitive with respect to the mobile terminal equipment being used by a subscriber.

SUMMARY OF THE INVENTION

The present invention provides a method and a system for providing automated help information to subscribers of a mobile telecommunications system that is context sensitive with respect to the mobile terminal equipment being used by a subscriber. Thus, a subscriber can conveniently obtain answers for the following exemplary questions about services without calling a customer service representative: How do I store a telephone number in memory? How do I retrieve a telephone number from memory. How do I read a text message? How do I store a text message? What capabilities does the cellular network have for Calling Number ID?

The advantages of the present invention are provided by a method and a system for providing automated information to a subscriber of a mobile telecommunications system in which a request for information is received on a mobile telecommunications system from a mobile communications device, such as a cellular telephone or a personal communications device. A type of mobile communication device from which the request for information is received is determined by accessing a mobile communications device profile based on an ESN and an MIN associated with the mobile communications device. The requested information is then sent to the mobile communications device. According to the invention, the requested information is context specific to the type of mobile communications device from which the request for information is received.

BRIEF DESCRIPTION OF THE DRAWING

The present invention is illustrated by way of example and not limitation in the accompanying figures in which like reference numerals indicate similar elements and in which.

DETAILED DESCRIPTION

The present invention provides a automated help service to subscribers of a mobile, or wireless, telecommunications system that is context sensitive with respect to the particular type of mobile terminal device used by subscriber requesting help information. According to the invention, a subscriber requests help by pressing a predetermined key or sequence keys on the keypad, such as *help (*4357). The subscriber is then connected to an Intelligent Peripheral (IP) platform that is part of the mobile telecommunications system. The IP platform performs a database query, based on the ESN and the MIN associated with the subscriber for accessing a profile associated with the subscriber, for determining the type of terminal device being used by the subscriber. Based on the results of the query, the IP platform generates automated responses, customized for the particular terminal device being used by the subscriber, for providing requested help information.

The present invention provides subscribers of a wireless telecommunications system with a capability of obtaining automated on-line help information about wireless service features without being required to speak to a customer service representative. The on-line help service of the present invention provides specific information about particular wireless services that are available to a subscriber, such as details regarding an unconditional call forwarding service, and/or specific feature codes, such as *71. Preferably, the on-line help information can be accessed via the mobile terminal device and via the Internet.

Figure 1:
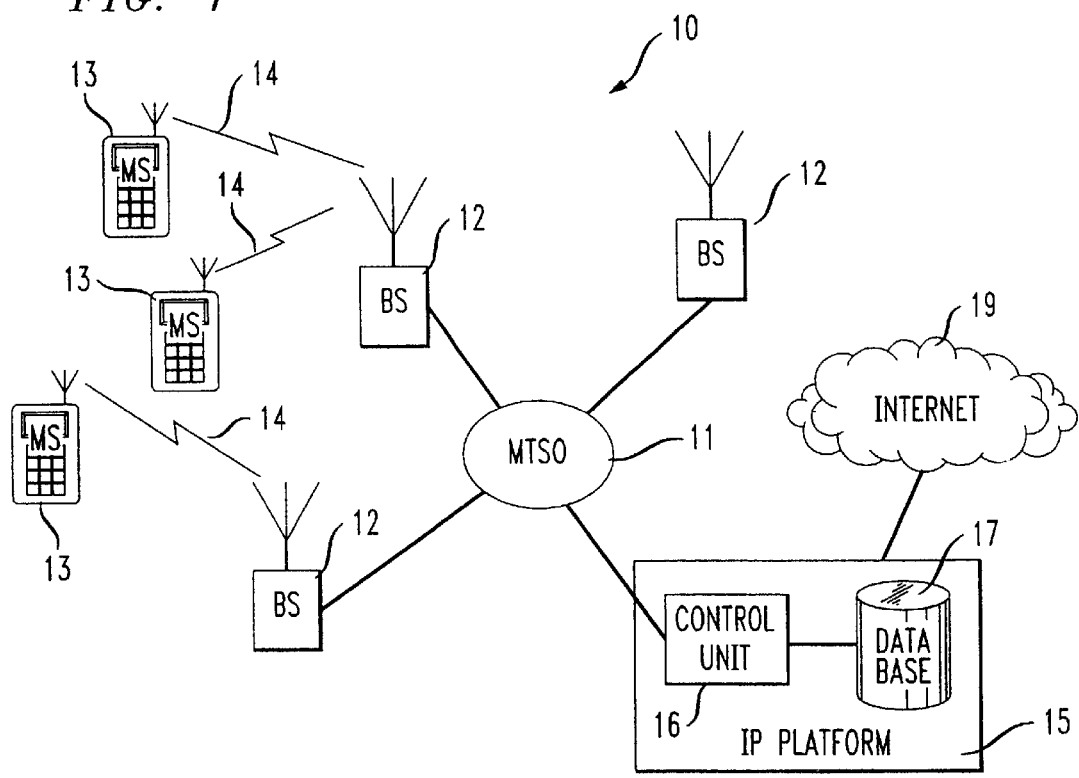
FIG. 1 shows a schematic block diagram of a mobile telecommunications system providing an automated help service according to the present invention.

FIG. 1 shows a schematic block diagram of a mobile telecommunications system 10 providing an automated help service according to the present invention. Mobile telecommunications system 10 includes a Mobile Telephone Switching Office (MTSO) 11 connected to a plurality of base stations (BS) 12 in a well-known manner. System 10 includes a plurality of MTSOs, even though only one MTSO is shown. Mobile stations (MS) 13, or mobile terminal devices, communicate with a nearby base station in a well-known manner using wireless communication links 14. Each mobile terminal device, such as a cellular telephone or a personal communications device, is uniquely identified by two numbers: an electronic serial number (ESN) encoded in the phone by its manufacturer, and a mobile identification number (MIN), which is the mobile telephone number programmed within the mobile telecommunications system. As used herein, a wireless or mobile communications system means a cellular, a satellite or a personal communications network environment.

An Intelligent Peripheral (IP) platform 15 is connected to MTSO 11 is a well-known manner. IP platform 15 includes a control unit 16 coupled to a database 17 that stores mobile communications device profile information for each subscriber of system 10. In operation, control unit 16 receives a request for help information from a mobile communications device 13 over system 10. Control unit 16 determines a type of mobile communication device from which the request for help information is received based on accessing a profile for the mobile communications device stored in database 17. IP platform 15 then sends requested help information to the requesting mobile communications device. The help information sent by IP platform 15 is made context specific based on the type of mobile communications device from which the request was received.

Figure 2:
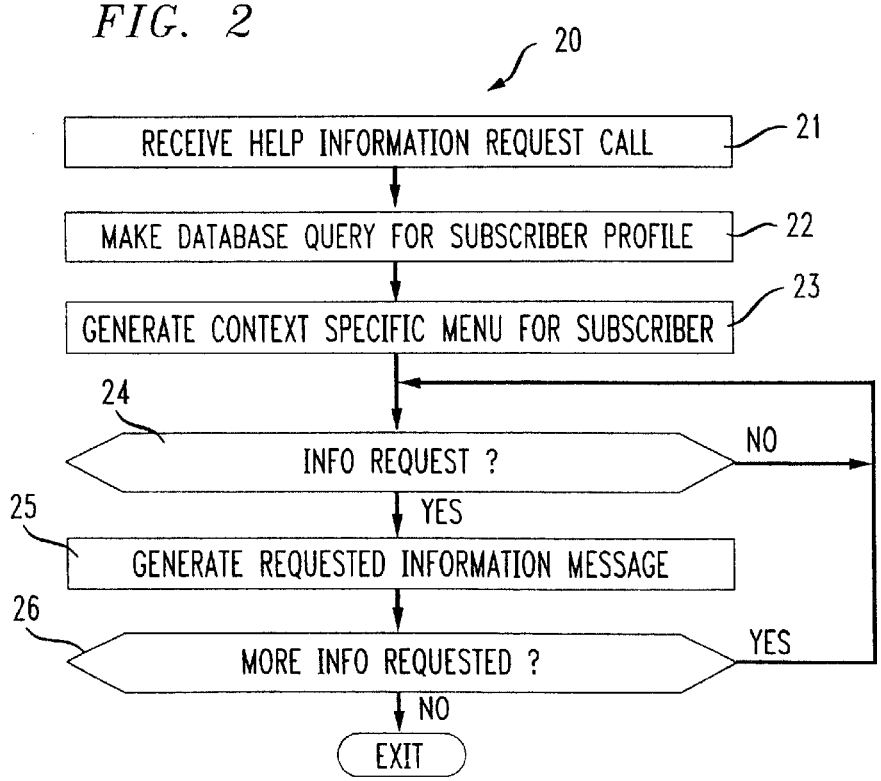
FIG. 2 shows a flow diagram for a process of providing an automated help service for a mobile telecommunications system according to the present invention.

FIG. 2 shows a flow diagram 20 for a process for providing an automated help service to a mobile telecommunications system subscriber according to the present invention. A wireless subscriber dials a special access number, such as, a three digit number, an "800" number, or "*HELP", etc., for accessing the automated on-line help information service of the present invention from a mobile terminal 13. The help information request call is routed to Intelligent Peripheral (IP) platform 15, which receives the call at step 21. At step 22, control unit 16 makes a query to database 17 for obtaining a user profile based on the ESN and the MIN received with the help request call.

At step 23, control unit 16 generates a menu providing the requesting subscriber with the ability to request information about features of a specific service or a specific feature code. According to the present invention, the menu is context specific for the equipment being used by the requesting subscriber. Information requests are made by the subscriber at step 24 by either entry of DTMF digits from the keypad of the mobile terminal device and/or by speaking voice commands. The voice commands are recognized using well-known speech recognition techniques. In response to a request, the IP platform plays a recording providing the wireless subscriber with the requested information that is context specific based on the subscriber's equipment at step 25.

The information provided by the IP platform is specifically directed to the type of mobile terminal device 13 used by a requesting subscriber. That is, an information message such as "The feature _____ provides the capability to _____; however, feature _____ is not available for your specific handset model, but is available on the AT&T Digital PCS handsets" may be generated by IP platform 15, where _____ is the particular network service for which help information is requested. The help information message can also refer to an Internet web page as another convenient way to access help information regarding wireless services available from mobile telecommunications system 10. Additionally, IP platform can provide help information that is specific to the type of wireless terminal equipment being used by the subscriber, such as help information about how to store and retrieve telephone numbers in the memory of the handset, and how to read, store and retrieve text messages.

At step 26, the subscriber is allowed to request more information about other wireless features and/or feature codes. Preferably, access to the on-line help information is also available to wireless terminal users who do not subscribe to the mobile services offered by system 10 so that they can experience the convenience of the on-line help information of the present invention and/or compare the services and features offered by system with the services and features that are available through their mobile telecommunications service provider. Alternatively, access to the on-line help information via a mobile handset can be restricted to existing subscribers to the wireless network depending on the dialing pattern that is required for accessing the on-line help information.

Any existing or potential wireless subscribers are able to access the on-line help information web page over the Internet 19 (FIG. 1). The web page accessible over the Internet can part of the services provided by IP platform 15 or can be remotely located from IP platform 14. Preferably, the Internet web page provides the ability to request information about a particular wireless service, a specific feature code for a particular wireless service, all services and features supported by the wireless network, and/or all feature codes supported by the wireless network within the context of a mobile communication device that is selected upon accessing the web page.

While the present invention has been described in connection with the illustrated embodiments, it will be appreciated and understood that modifications may be made without departing from the true spirit and scope of the invention.

What is claimed is:

1. A method for providing automated information to a subscriber of a mobile telecommunications system, the method comprising:
   receiving from the mobile communications device a request for at least one of operating options and operating instructions for the mobile communication device on a mobile telecommunications system;
   determining a type of mobile communication device from which the request is received;
   generating at least one of operating options and operating instructions for the mobile communication device, the at least one of operating options and operating instructions being context specific to the type of mobile communications device from which the request is received and based on results of the determining step; and
   making the at least one of operating options and operating instructions available to the mobile communication device via a web page.

2. The method according to claim 1, wherein determining further comprises accessing a mobile communications device profile.

3. The method according to claim 2, wherein receiving the request includes receiving a unique identifier associated with the mobile communications device; and
   wherein accessing a mobile communications device profile is based on the unique identifier.

4. The method according to claim 3, wherein the mobile communications device is a cellular telephone.

5. The method according to claim 4, wherein the mobile communications device is a personal communications device.

6. The method according to claim 4, wherein generating at least one of operating options and operating instructions for the mobile communication device includes generating a message comprising the at least one of operating options and operating instructions.

7. The method according to claim 6, wherein the message includes information relating to a way for accessing the requested information.

8. A device for providing automated information to a subscriber of a mobile telecommunications system, the device comprising:
   a database containing information relating to a mobile communications device; and
   a control unit, coupled to the database, receiving a request for at least one of operating options and operating instructions for the mobile communication device from a mobile telecommunications system from the mobile communications device, the control unit determining type information for the mobile communication device from which the request is received based on accessing a profile for the mobile communications device stored in the database, and causing the at least one of operating options and operating instructions to be available to the mobile communications device via a web page, the at least one of operating options and operating instructions being context specific to the type of mobile communications device from which the request is received.

9. The device according to claim 8, where in the request for information includes a unique identifier associated with the mobile communications device, and
   wherein the mobile communications device profile relates to the unique identifier associated with the mobile communications device.

10. The device according to claim 9, wherein the mobile communications device is a cellular telephone.

11. The device according to claim 9, wherein the mobile communications device is a personal communications device.

12. The device according to claim 9, wherein the control unit generates a message containing the requested information.

13. The device according to claim 12, wherein the message includes information relating to a way for accessing the requested information.

14. The device of claim 8 wherein the requested information is help information.

15. The device of claim 8 wherein the requested information is help information.

16. A method for providing automated information to a subscriber of a mobile telecommunications system, the method comprising:
   receiving at a mobile telecommunications system, an ID message and a request for at least one of operating options and operating instructions for a mobile communications device;
   determining type information for the mobile communication device based on the ID message;
   using the type information and the request, accessing from a database at least one of operating options and operating instructions that is context specific to the mobile communications device; and
   including in a web page the at least one of operating options and operating instructions to the mobile communications device.

17. The method of claim 16 further comprising:
   generating a menu in response to the accessing of information and providing information about plural features of the mobile communications device.

18. The method of claim 16 wherein the request is for help information.

19. A system for providing automated information to a subscriber of a mobile telecommunication system, the system comprising:
   a database that stores information for a mobile communications device; and
   a control unit, coupled to the database, receiving an ID message and a request for at least one of operating options and operating instructions from the mobile communications device, the control unit determining type information for the mobile communication device based on the ID message, the control unit accessing at least one of operating options and operating instructions that is context specific to the mobile communications device from the database using the type information and the request, and the control unit causing the at least one of operating options and operating instructions to the mobile communications device to be included in a web page.

20. The system of claim 19 wherein the control unit generates a menu in response to the accessing of information and provides the menu to the mobile communications device for accessing the web page information about features of the mobile communications device.

21. The system of claim 19 wherein the request is for help information.

22. A method for providing automated information to a subscriber of a mobile telecommunications system, the method comprising:
   receiving a request for help information on a mobile telecommunications system from a mobile communications device;

determining a type of mobile communication device from which the request for information is received; and causing the requested help information to be included in a web page, the requested information being context specific to the type of mobile communications device from which the request for information is received.

23. A method for providing automated information to a subscriber of a mobile telecommunications system, the method comprising:

receiving a request for help information on a mobile telecommunications system from a mobile communications device;

determining a type of mobile communication device from which the request for information is received; and including in a web page a menu for selecting the requested help information, the menu being context specific to the type of mobile communications device from which the request for information is received.

24. A method for providing automated information to a subscriber of a mobile telecommunications system, the method comprising:

receiving a request for help information on a mobile telecommunications system from a mobile communications device;

determining a type of mobile communication device from which the request for information is received;

including in a web page a menu of help options to the mobile communications device;

receiving a selection from the menu; and sending specific help information to the mobile communications device in response to the selection, the specific help information being context specific to the type of mobile communications device from which the request for help information is received.

* * * * *